United States Patent
Pardikes

[19]

[11] Patent Number: 6,120,742
[45] Date of Patent: Sep. 19, 2000

[54] CONTROLLER AT POLYMER ELECTROLYTE INTERFACE FOR SYSTEM FOR MIXING AND ACTIVATING POLYMERS

[76] Inventor: Dennis G. Pardikes, 12811 S. 82 St., Palos Park, Ill. 60464

[21] Appl. No.: 09/071,460

[22] Filed: May 1, 1998

[51] Int. Cl.⁷ .................. B01F 5/04; B01F 15/02
[52] U.S. Cl. .................. 422/278; 366/177.1; 366/179.1; 366/181.5; 366/182.4
[58] Field of Search .................. 422/278, 261; 366/151.1, 163.2, 177.1, 179.1, 181.5, 182.4

[56] References Cited

U.S. PATENT DOCUMENTS 3,468,322  9/1969  Katzer .
4,168,018  9/1979  Zahaykevich ............................. 222/82
4,537,513  8/1985  Flesher et al. ......................... 422/278 X
5,344,619  9/1994  Larwick et al. ........................ 422/278 X

*Primary Examiner*—Elizabeth McKane
*Attorney, Agent, or Firm*—Laff, Whitesel & Saret, Ltd.; J. Warren Whitesel

[57] ABSTRACT

A system for activating or inverting modern, fast to activate polymers has a chamber with two entrances, one for neat polymer and one for an electrolyte. The polymer and electrolyte first meet at a polymer/electrolyte interface formed by an orifice in the polymer entrance. Within the chamber, a valve is arranged at that orifice so that the neat polymer never encounters the electrolyte during periods when the system is shut-down and not operating. This increases the maintenance time period between back flushing and cleanout of the polymer delivery channel.

14 Claims, 3 Drawing Sheets

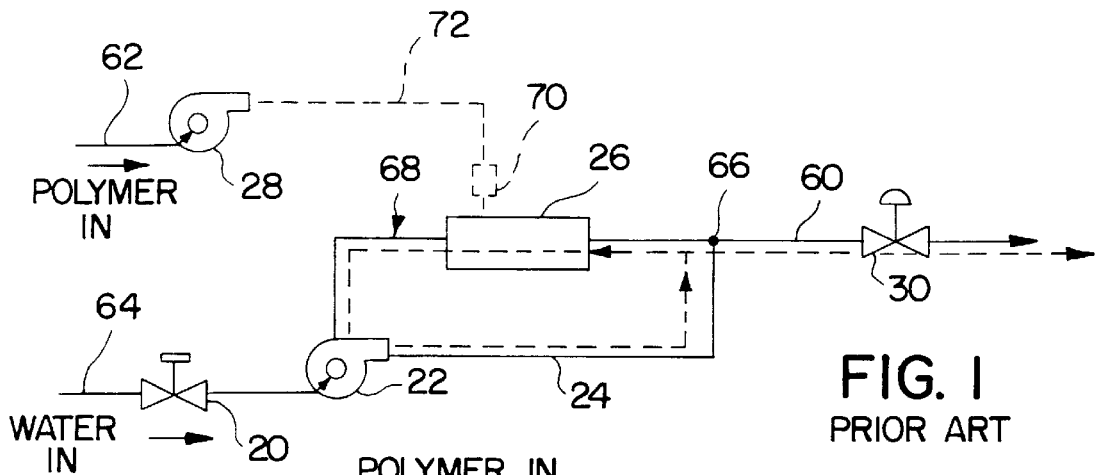
FIG. 1 PRIOR ART
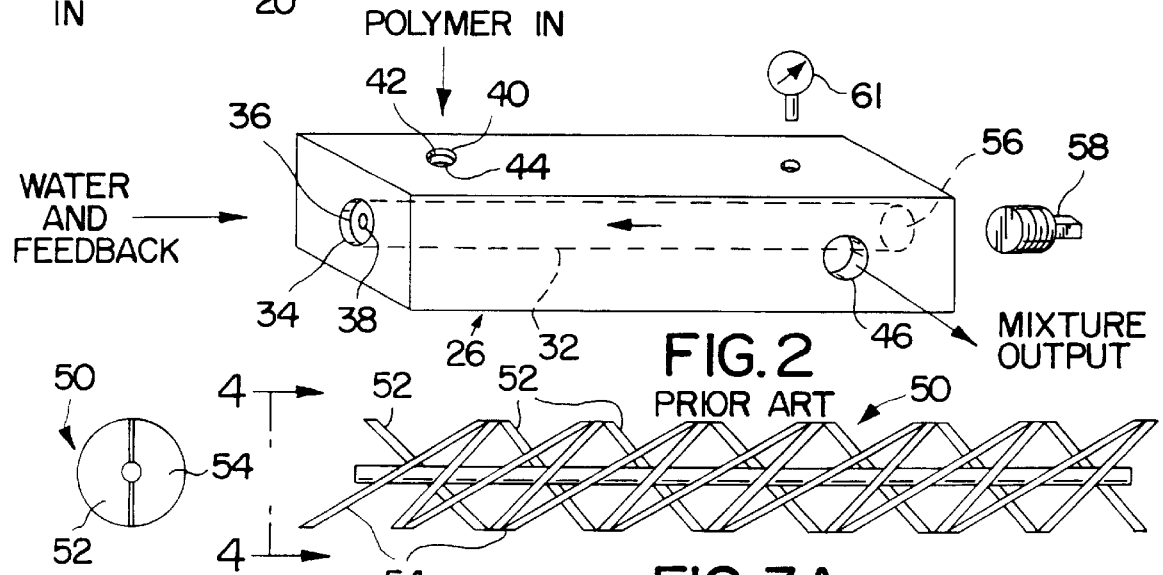
FIG. 2 PRIOR ART
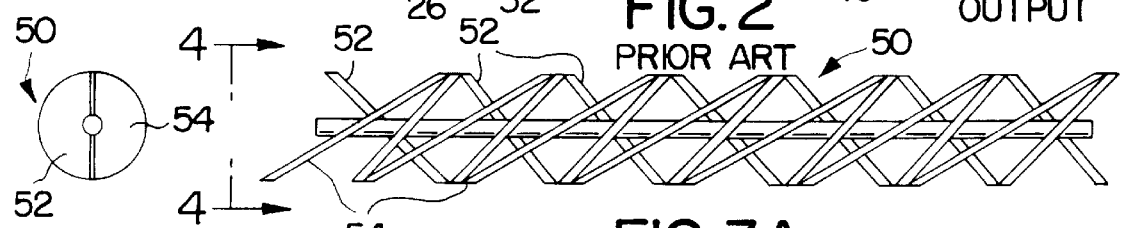
FIG. 3A PRIOR ART
FIG. 4 PRIOR ART
FIG. 3B PRIOR ART

CONTROLLER AT POLYMER ELECTROLYTE INTERFACE FOR SYSTEM FOR MIXING AND ACTIVATING POLYMERS

This invention relates to means for and methods of controlling a mixing of a polymer and electrolyte at an interface between the polymer and electrolyte in a system for mixing and activating or inverting polymers.

The terms "activation" or "inversion" are widely used to describe the transition of a polymer from an inactive form "as manufactured" to a usable form. Recently, the terminology has tended to focus on the degree of transition which has occurred, with some people arguing that there must be 100% activation before the word "activation" can be used. Since nothing is ever perfect, it is seen that if this argument is carried to the extreme, very little polymer would ever be 100% activated. Perhaps the word "inversion" might be more appropriate since it applies regardless of the degree of the completion of the activating process. Liquid or emulsion polymers are ionic-charged organic molecules which are soluble in water or another electrolytic fluid. Hereinafter, all appropriate electrolytes are simply called "water", for convenience of expression.

Those who are familiar with this art will readily perceive many forms of and uses for polymers, in many industries. Usually polymers are manufactured and shipped in an inactive form to a location where they will be used. At that location, it is necessary to activate or invert the polymers before they can be used. Usually, that means that a polymer must be mixed with water or other electrolyte (solvent), or with another chemical, which can change the polymer from an inactive state into an active state. The process for so converting the polymer into an active state is one of imparting a sufficient amount of energy to the polymer while it is in the presence of an electrolyte, usually water. Reference may be made to U.S. Pat. Nos. 4,057,233, 4,128,147 and 4,217,145 for examples of prior art polymer activating systems.

Different polymers require different amounts of energy for activation. Tougher polymers require more force, while others need less force. Further, care must be taken not to use so much energy that it will overshear the molecules, which would tend to break the molecules, thus lowering their viscosity and making them less effective. Undershearing also is deleterious in that the polymer is then inefficient and uneconomical.

Recent developments in the chemical field have produced modem polymers which react very quickly (as compared previously available polymers) to activation or inversion. This quick reaction converts these polymers from a free flowing state into a semi-solid and non-flowing state. As a result, the machines which perform the activation soon becomes clogged with a build-up of gummy tacky activated polymer debris, especially during pauses or shut downs after periods of activation. This build-up requires an undue amount of downtime in order to backflush and clean out the system.

The objectional build-up of polymer debris results in large part from a back flow of water into the system for delivering neat polymer to the activation device.. The back flow or diffusion usually occurs immediately upon shut down and continues thereafter until the next start up. In the past, this problem has been solved by providing a check valve in the pipe which delivers the neat polymer to the activation device. These check valves have worked very well, but that was with "old fashioned" polymers which are slower to activate by current standards. With the newer and faster acting polymers, the check valve itself becomes clogged.

Accordingly, an object of the invention is to provide new and improved means for and methods of activating relatively fast acting polymers without creating a build-up of tacky polymer debris.

Another object of the invention is to provide a flexible system with a controller which acts at the polymer/water interface, usually inside the apparatus that mixes the polymer with water or another electrolyte in order to activate it.

Yet another object of the invention is to provide an efficient system and method for activating liquid polymers.

In keeping with an aspect of the invention, in my system, the activation of a polymer occurs in four stages, which are: pre-mixing, blending, recycling, and a final sudden pressure reduction. The pre-mixing of polymer and water begins at an interface between polymer and water inside a manifold containing a static mixer. Then, a portion of the mixed polymer and water is fed back into the static mixer where the mixture again encounters the polymer and water interface. The other and remaining portion of the mixture is delivered to a pressure regulator where the pressure imparted by a pump is suddenly reduced to, or near, atmospheric pressure. This suddenly relaxes the long polymer molecule and leads to the activation or inversion of the polymer. The invention provides a valving arrangement inside the activating machine and at the interface or layer between the water and polymer in order to prevent any mixing of the two when the system is not operating.

The invention will be understood best from a study of the following specification taken with the attached drawings, wherein:

FIG. 1 schematically shows the principles of a polymer activation or inversion system having two inputs which are, respectively, for water and for the neat polymer that is to be activated;

FIG. 2 is a perspective view of a pre-mixing manifold;

FIGS. 3A and B are two plan views (rotated by 90 degrees from each other) of a static mixer which is used inside the manifold of FIG. 2;

FIG. 4 is an end view of the static mixer, taken along line 4—4 in FIG. 3A; and

FIG. 5 schematically shows a polymer/water interface inside the prior art mixer of FIG. 2;

Figure 5:
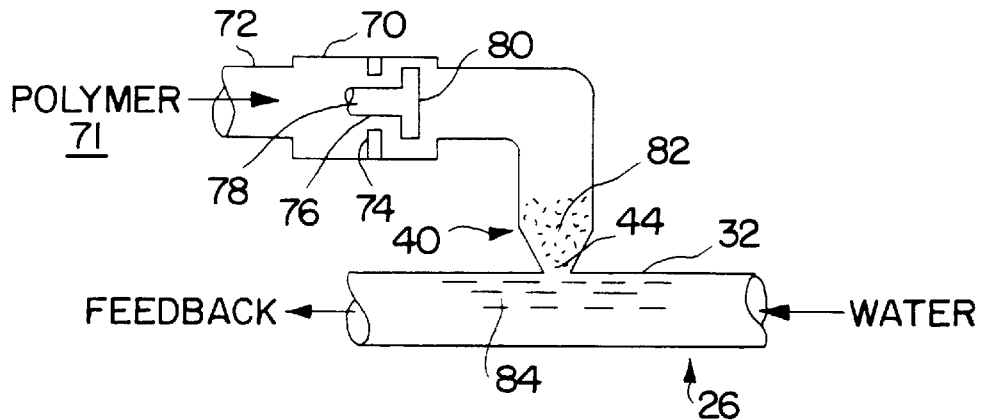

In FIG. 1, the system components are an input throttling valve 20 for controlling the amount of water and therefore the ratio of water to polymer, a centrifugal pump 22 for introducing the water under pressure into the activating system, a closed mixing loop 24, a pre-mixing manifold 26, and a centrifugal pump 28 for introducing the neat polymer via a neat polymer line 72. The water and polymer first meet at an interface inside the pre-mixing manifold 26, the water flow being indicated in FIG. 1 by solid lines and the polymer flow being indicated by dashed lines.

Valve 20 may be set to provide a ratio of about 99% water to about 1% polymer in one example, with a useful range of ratios being in the order of 0.25 to 15% polymer. Associated with valve 20 may be a meter (not shown) which is calibrated in terms of gallons per minute. By an adjustment of the valve 20, one can also select the desired ratio of polymer to water at the output of the system.

The mixing pressure regulator 30 is provided for three reasons. It is used to maintain a constant net positive discharge head on the booster module or centrifugal pump 22. It controls the amount of recycling which occurs in the recycle stage 24, 68. It provides a variable pressure drop zone in the final stage and enables the operator to select a proper amount of mixing energy, based on the type and concentration of polymer being processed. The pressure regulator 30 is a standard commercial item.

In greater detail, the mixing manifold 26 (FIG. 2) is, for example, a solid block of metal having a central bore 32 which forms a chamber extending through substantially the entire length of the block. The bore 32 stops short of a counterbored and threaded input opening 34, to form a bulkhead 36. An orifice 38 of fixed diameter is formed in the center of the bulkhead 36 to establish fluid communication between the water inlet 38 and the central bore 32, with a flow rate that is controlled by the orifice diameter.

A first transverse, threaded hole 40 leads to another bulk head 42 between the threaded hole 40 and the central bore 32. An orifice 44 is formed in the bulkhead 42 to establish fluid communication and to control the flow rate between the hole 40 and the central bore 32. This is the entrance for neat polymer delivered via line 72, the water/polymer interface occurring in orifice 44 at the intersection of hole 40 and center bore 32.

The output port 46 is in direct communication with the central bore 32 to give an unimpeded outflow of a mixture of polymer and water as shown at 68 in FIG. 1.

A static mixer 50 (FIGS. 3, 4) comprises two sets of semi-elliptical baffles which are set at an angle with respect to each other so that the over all end view configuration is a circle (FIG. 4). The baffles 52 (FIG. 3A) on one side of the static mixer are a series of spaced parallel plates. The baffles 54 on the other side of the static mixer are joined on alternate ends to give an over all zig-zag appearance. The outside diameter (FIG. 4) of the static mixer corresponds to the inside diameter of the central bore 32. Therefore, the static mixer 50 slides through an end opening 56 and into bore 32. Thereafter a plug 58 seals off the end of the bore 32.

Water is introduced into the mixing loop 24 (FIG. 1) via the centrifugal pump 22, and is controlled and metered by the throttling flow valve 20. The beginning stages of activation or pre-blend stage occurs inside the centrifugal pump assembly 22 when it receives a fed back mixture of polymer and water at 68.

The pump 22 is operated in the manner described by the pump manufacturer to deliver 100-gallons per minute, but the diameter of the impeller is reduced until the delivery is only 20 gallons per minute. Thus, in this particular example, the pump continues to be operated in the manner which the manufacturer suggests for 100-gallons per minute. However, since the centrifugal pump has been derated by a factor of 5 (i.e. derated from 100-to-20-gallons per minute), the increased impeller speed, which is normally required to deliver 100-gallons per minute, imparts a higher level of energy to the mixed fluid without increasing the delivered volume of fluid output.

A variable speed, positive displacement pump 28 introduces the unactivated neat emulsion polymer into hole 40, then through the premix manifold 26 and the mixing loop 24. Pump 28 delivers the polymer at a rate which achieves a range of desired concentrations. A calibration column (not shown) is provided to correlate the variable speed pump 28 to its capability in order to deliver the unactivated polymer at a rate which accurately obtains the desired concentration.

A first portion of the mixed water and polymer solution is recycled, via line 68, loop 24, back through the premix manifold 26 and the booster module (centrifugal pump 22) which continues to boost the activation level of the polymer.

The final stage of polymer activation acts on a second portion of the mixed water and polymer and is controlled by the mixing pressure regulator 30. The portion of this polymer/water solution passing through the regulator 30 experiences a sudden pressure drop which fully activates the solution. This pressure drop is adjustable and represents an important factor in achieving fully activated polymer molecules.

The sudden and abrupt relaxation of pressure at regulator 30 is from the pressure in line 60 to or near atmospheric pressure which causes an effect that is somewhat similar to the aging which occurs in a holding tank in some prior art systems. A limiting factor is that the pressure regulator 30 cannot be adjusted to operate at any level which causes cavitation in the pump 22. Once the desired output rate and level of activation is selected, the mixing pressure regulator 30 automatically compensates for any surging or ebbing flow which is attendant upon changes in the output flow rate. Thus, pressure regulator 30 maintains the desired level of activation in the centrifugal pump 22.

In the prior art, a check valve 70 (FIG. 1) is provided at some convenient location in the neat polymer delivery line 72, usually as close as possible to entrance 40 on the mixing manifold. To understand the reason for this valve, reference may be made to FIG. 5 which is a diagram that uses the same reference numerals that are found in FIGS. 1 and 2.

According to the prior art, the neat polymer is fed through pipe 72 and check valve 70 to entrance 40 of mixing manifold 26 of the FIGS. 1–4 system. The valve 70 is shown schematically as having a bulk head 74 with a circular hole 76 therein. Sliding through hole 76 is a stem 78 attached to a head 80 which is forced to one of the open or closed positions by any suitable means. In one case, the valve is opened in response to pressure caused by pump 28 (FIG. 1) driving polymer 71 through pipe 72, valve 70, and orifice 44 into bore 32.

When the pump 28 shuts down, this pressure in pipe 72 disappears and any suitable means (such as a spring, not shown) pulls valve head 80 into a firm contact with the bulkhead 74, The valve 70 is then closed and the interface between polymer 82 and water 84 at orifice 44 does not significantly recede into the area 40. After shut down, the polymer at the interface boundary between polymer 82 and water 84 does not receive enough activity energy to cause the polymer to significantly change its characteristics from the characteristic of the polymer in the pipe 72. Accordingly, cleaning the orifice 44 and area 40 is required only during reasonable intervals on an acceptable maintenance schedule.

Figure 6:
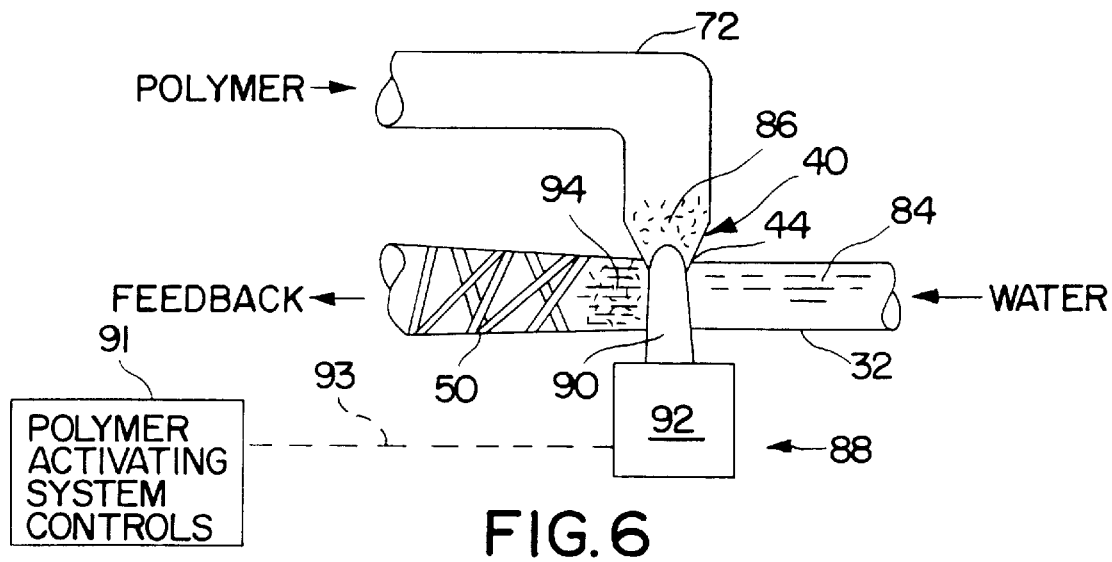
FIG. 6 is a schematic view similar to the device shown in FIG. 5, with the inventive valve in place and in a closed position.

However, some of the modern polymer 86 FIG. 6) are so easily and quickly activated that, in the environment of FIG. 5, the polymer would become gummy, first in the orifice 44. Soon thereafter, the gumminess forms perhaps as far back as the check valve 70, eventually making it inoperative. Hence, when used with modern, fast acting polymers, this prior art construction leads to the need for frequently cleaning the orifice on a completely unacceptable maintenance schedule.

The problem that is presented by the modern polymers seems insurmountable until one recognizes that the source of the problem lies in the boundary area at the interface between water 84 and polymer 86 (FIG. 6). Therefore, a solution to the problem caused by the gummy buildup of polymer debris is one of moving the check valve or other back flow control device directly to the polymer/water interface. As a practical matter, this means putting the check valve directly into the device which actually mixes and activates the polymer and water and at the point where the polymer first meets the water.

Accordingly, the invention involves locating the neat polymer input port 40 at a point along the length of central bore 32 where the cross section of bore 32 is free of all obstructions, such as the static mixer 50. An internal valving device 88 (FIG. 6) is located at the interface between polymer and water. The device 88 comprises a plunger 90 controlled by a driver 92 which may be any suitable device such as a spring, solenoid, air cylinder, or the like, for example. The plunger-driver assembly is suitably sealed to the bore 32 so that there is no leakage around the base of the plunger 90 regardless of the operated or unoperated condition of the system. Upon shut-down of the system, driver 92 moves the plunger 90 directly into the orifice 44. Hence, in the normal condition where the system is not operating, the plunger 90 driven into orifice 44 virtually prevents any mixing between water 84 and polymer 86. There is a mixture of polymer and water at 94; however, the ratio of water to polymer prevents gumming. In some instances, the pump 22 may continue to run for a while after shut-down and drive water that flows around plunger 90 and through the area 94 until clear water is flowing through the static mixer, thereby preventing or greatly reducing polymer from being in the area 94.

Figure 7:
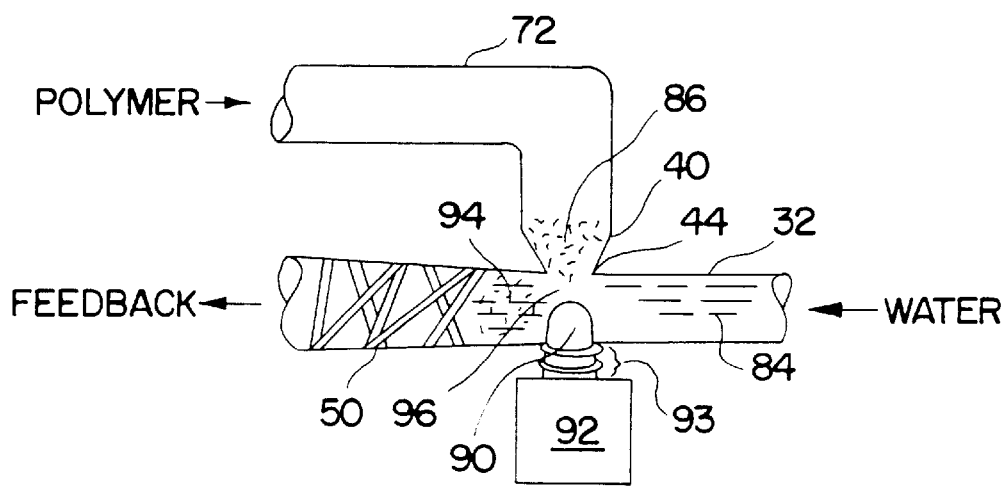
FIG. 7 is a view similar to FIG. 6, but with the valve open.

When the polymer activation or inversion system is operating (FIG. 7), the driver 92 pulls plunger 90 out of the orifice at 44 which enables polymer 86 to flow into area 94 and on through the static mixer 50 in the chamber provided by the bore 32. The neat polymer delivered through pipe 72 and the water delivered through bore 32 meet and mix at an interface 96. However, at this time, both of the pumps 22 and 28 are operating. Both the polymer and water are being driven toward static mixer 50 so that the water does not feed back and into the area 40 which, therefore, stays clean and free of any gummy build up.

A polymer activating system control means 91 appears in FIG. 6. This polymer activating control system that may be any suitable device ranging from a simple on/off switch to a complex computer, with or without sensors, that monitors the output flow of activated polymer. Regardless of what kind of controller is used, a suitable signal is transmitted from the controller 91 across line 93 to activate and control driver 92. When controller 91 is operated so that the system is activating polymer, driver 92 withdraws the two position plunger 90 to open orifice 44 (FIG. 7) or drives the two position plunger to close orifice 44 (FIG. 6). O-rings 93 seal the plunger to prevent any leakage.

Hence, it is seen that the valve works at the boundary of the polymer/water interface to almost completely block any exchange between water and polymer during periods of system shut-down. Still, during shut-down, there may be a water flow which cleans the mixture of polymer and water from the equipment.

The foregoing description of FIGS. 1–4 illustrate the preferred system in which the invention may be used. Nevertheless, there are other polymer mixing and activating systems which may also use the invention to block an exchange or mixing of water and polymer during shut-down.

Figure 8:
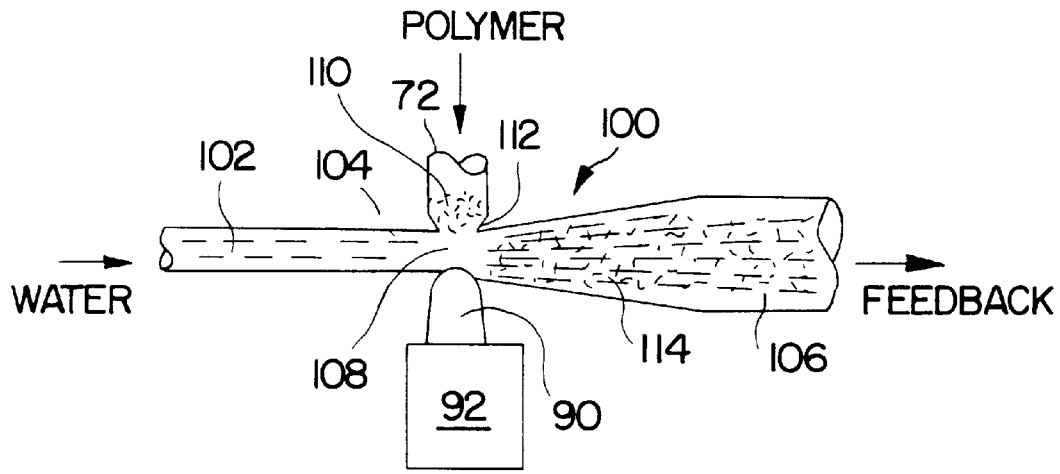
FIG. 8 is a schematic view of an open interface valve, which is another embodiment using the inventive principle in an eductor.
Figure 9:
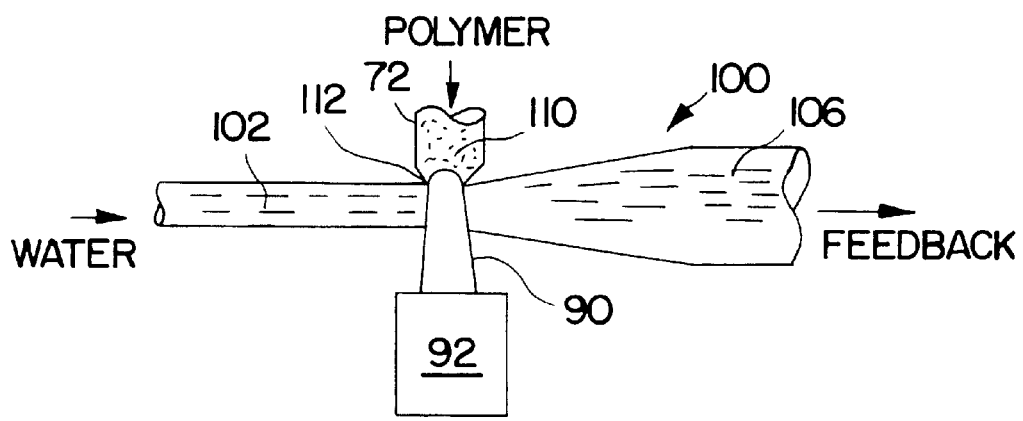
FIG. 9 is essentially the same as FIG. 8, but with the interface valve closed.

FIGS. 8, 9 schematically illustrate a use of the invention in an eductor instead of in a static mixer. FIG. 8 shows the valve at the polymer/water interface in an open position. FIG. 9 shows the valve closed.

In greater detail, an eductor 100 is a venturi where a rapidly flowing stream of water 102 moves through a passageway 104 having a reduced diameter 108 to an output 106. In the passageway, restriction 108 speeds the flowing stream, thereby pulling polymer 110 through orifice 112 where it is pulled along by the fast flowing stream 108 in restriction 108 where it is mixed with the water in chamber 114. From there, the mixture may exit at 106 and be further processed in any convenient and appropriate manner.

Figure 10:
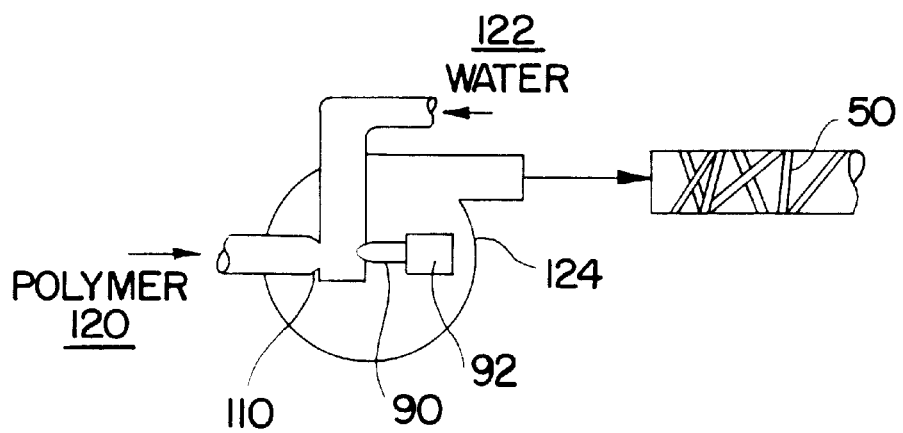
FIG. 10 is a schematic view which shows the interface valve incorporated in a pump.

FIG. 10 shows another system wherein both the polymer 120 and the water 122 are inserted into a pump 124 which does the mixing. More particularly, polymer 120 and water 122 meet at an interface at orifice 110 and then are fed into a chamber formed at an eye of the pump 124. The pump pre-mixes them and then drives the pre-mixture through a static mixer 50. The plunger 90 of an interface valve is here shown in an open position. When the system is shut-down the driver 92 drives the plunger 90 into contact with orifice 110.

The foregoing examples illustrate how a valve may be positioned at the boundary of the polymer/water interface. The same principle may be applied at virtually any location where polymer and water meet at an interface boundary. Hence, those who are skilled in the art will readily perceive various modifications which may fall within the spirit and the scope of the invention. Therefore, the appended claims are to be construed to cover all equivalent structures.

The claimed invention is:

1. A system for activating polymer comprising a mixing means, a chamber with two entrances and an exit leading to said mixing means, a source of neat polymer coupled to said chamber via a first of said two entrances, a source of electrolyte coupled to said chamber via a second of said two entrances, said polymer and electrolyte meeting at a boundary forming a polymer/electrolyte interface at said first of said two entrances, valve means internal to said chamber, and said valve means comprising a two position device at said first entrance and located at said polymer/electrolyte interface, one of said two positions opening said first entrance and the other of said two positions closing said first entrance, and power driven means for selectively and positively moving said valve means between said two positions responsive to a signal at a start of an operation or a shut-down of said polymer activating system, said valve means preventing said polymer from entering said chamber during shut down of said polymer activation system.

2. The system of claim 1, wherein said interface is defined by an orifice between said source of neat polymer and said chamber, said valve means comprises a part which may be projected to or retracted from said orifice, and driver means for moving said plunger to or away from said orifice in response to said operation or shut down of said polymer activating system.

3. The system of claim 2, wherein said mixing means comprises a manifold having said chamber in the form of a bore with a static mixer therein, said first of said two entrances being in said bore and at a location which is free of said static mixer means.

4. The system of claim 2 wherein said chamber is in the form of an eductor having first and second ends with a restricted cross sectional area therebetween, said first of said entrances being an orifice at one side of said restricted cross sectional area and the second of said entrances being at one of said ends, and said valve means comprises a plunger on an opposite side of said restricted cross section and being positioned to open and close said orifice responsive to the operation of said moving means.

5. The system of claim 1, wherein said chamber is a pump, first means for conveying neat polymer to an input of said chamber, second means for conveying an electrolyte into said chamber, said polymer and said electrolyte meeting an orifice at said interface associated with said first entrance, and said valve means comprises a means positioned opposite said orifice to enable or block said polymer from crossing said interface.

6. A polymer activating system comprising means for pre-mixing a polymer and an electrolyte which first meet at a polymer/electrolyte boundary, means for blending said pre-mixed polymer and electrolyte after they meet and pass said boundary, means for releasing said blended polymer and electrolyte at a pressure dropping output of said system, means for switching said polymer activating system off and on, power driven means at said polymer/electrolyte boundary and responsive to a signal occurring in response to switching off said system flow control for positively blocking the polymer from crossing the boundary, and responsive to a signal occurring in response to switching on said system and for positively enabling the polymer to cross the boundary.

7. The system of claim 6 wherein said boundary is defined by an orifice through which said polymer may flow to meet said electrolyte, and said flow control means is a valve means which opens and closes said orifice.

8. The system of claim 7 wherein said valve means is a plunger which plugs said orifice in order to block said orifice and unplugs said orifice in order to enable said polymer to cross said boundary.

9. The system of claim 6 wherein said pre-mixing means is selected from a group consisting of a manifold, an eductor, and a pump.

10. The system of claim 9 wherein said flow control means comprises an orifice at said boundary and a plunger for selectively plugging and unplugging said orifices.

11. A device comprising a passage way having two entrances and a remote exit, a common boundary being formed between said two entrances, means for inserting polymer through one of said entrances, means for inserting an electrolyte through another of said entrances whereby said polymer and electrolyte first meet at said common boundary, valve means located at said common boundary, mean for selectively and positively operating said valve means for opening and closing said boundary, and means for opening said valve to enable said polymer and electrolyte to mix responsive to a demand signal for said mixture at said exit and for closing said valve to prevent said polymer from mixing when there is no demand signal for said mixture at said exit.

12. The device of claim 11 wherein said two entrances and said exit are to and from a single chamber in a device selected from a group consisting of a manifold, an eductor, and a pump.

13. The device of claim 12, wherein said driver means is selected from a group consisting of a spring, a solenoid, and an air piston.

14. The device of claim 13 wherein said chamber contains static mixer.

* * * * *